United States Patent
Tondolo

(10) Patent No.: US 10,337,625 B2
(45) Date of Patent: Jul. 2, 2019

(54) SLIDE FLOW DISTRIBUTOR

(71) Applicant: STI SRL, Gorle (BG) (IT)

(72) Inventor: Flavio Tondolo, Stezzano (IT)

(73) Assignee: STI S.R.L., Gorle (BG) (IT)

( * ) Notice: Subject to any disclaimer, the term of this patent is extended or adjusted under 35 U.S.C. 154(b) by 0 days.

(21) Appl. No.: 15/500,066

(22) PCT Filed: Aug. 1, 2014

(86) PCT No.: PCT/IT2014/000202
§ 371 (c)(1),
(2) Date: Jan. 29, 2017

(87) PCT Pub. No.: WO2016/016909
PCT Pub. Date: Feb. 4, 2016

(65) Prior Publication Data
US 2017/0261111 A1   Sep. 14, 2017

(51) Int. Cl.
*F16K 11/07*   (2006.01)
*F16K 35/04*   (2006.01)
*F16K 31/04*   (2006.01)
*F16K 31/124*  (2006.01)

(52) U.S. Cl.
CPC .............. *F16K 11/07* (2013.01); *F16K 31/04* (2013.01); *F16K 31/124* (2013.01); *F16K 35/04* (2013.01); *Y10T 137/8663* (2015.04); *Y10T 137/86622* (2015.04)

(58) Field of Classification Search
CPC ....... Y10T 137/86622; Y10T 137/8667; Y10T 137/86694; Y10T 137/8671; Y10T 137/87217; Y10T 137/8663; F16K 11/04; F16K 31/04; F16K 31/124; F16K 35/04; F16K 11/0704
USPC ............ 137/625.65, 625.25, 625.67, 625.69, 137/596.17, 625.66; 251/129.03
See application file for complete search history.

(56) References Cited

U.S. PATENT DOCUMENTS

| | | |
|---|---|---|
| 4,328,950 A | 5/1982 | Aspinwall |
| 4,522,373 A | 6/1985 | Shelbourn |
| 2006/0108451 A1* | 5/2006 | Alexander ............ B05B 7/0815 239/526 |
| 2011/0001070 A1* | 1/2011 | Wilke ................. F16K 31/1262 251/129.03 |

(Continued)

*Primary Examiner* — Kevin F Murphy
*Assistant Examiner* — Kelsey E Cary
(74) *Attorney, Agent, or Firm* — R. Ruschena Patent Agent, LLC

(57) ABSTRACT

A slide flow distributor to direct and modulate a gaseous fluid, in inlet and outlet. This regulation is carried out by means of a spool, which conveys compressed air in a determined charging direction and puts in communication the other chamber with the environment at the same time. This is a servo-actuator which can be used in the field of pneumatic systems of valve actuation. It has a specific pneumatic servo-actuating system using compressed air. This distributor uses a linear motor using a new pneumatic servo-actuator which generates a force in the same direction of the axial force of the motor, with the result that the spool is accelerated in a predetermined direction. The pneumatic servo-actuator is made of a profiled body, a plurality of balls and corresponding elastic means which press the plurality of balls on the side surface of the profiled body.

6 Claims, 4 Drawing Sheets

(56) References Cited

U.S. PATENT DOCUMENTS

2011/0232791 A1\* 9/2011 Bengea ............... F16K 31/0613
  137/625.64
2013/0087729 A1\* 4/2013 Bento ................. F15B 13/0402
  251/282

\* cited by examiner

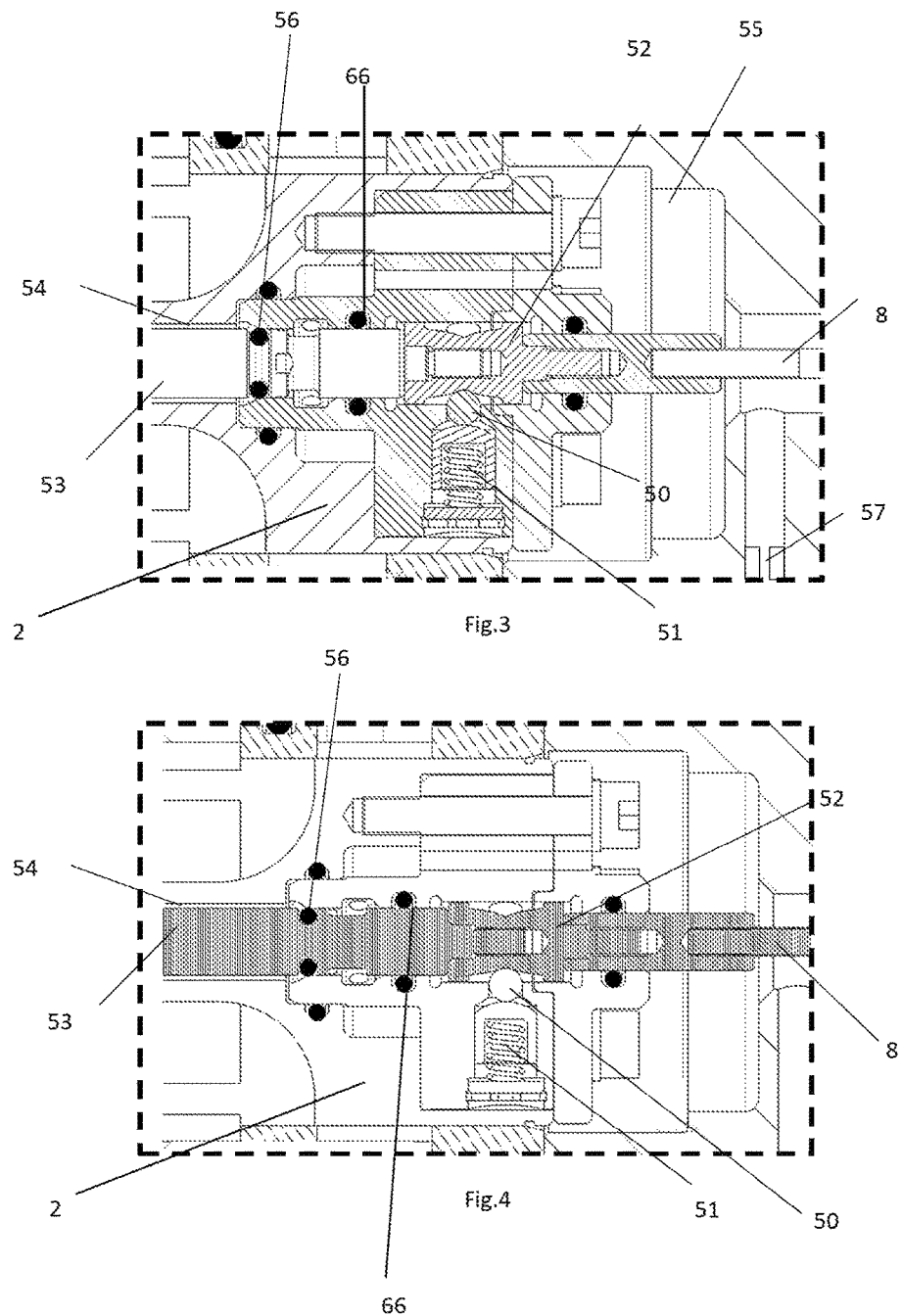

SLIDE FLOW DISTRIBUTOR

BACKGROUND OF THE INVENTION

1. Field of the Invention

The present invention relates to a slide flow distributor, i.e. a device apt to direct and modulate a gaseous fluid, generally air, in inlet and outlet. This regulation is carried out by means of a spool, which, according to its position, conveys compressed air in a determined charging direction and puts in communication the other chamber with the environment at the same time.

2. Brief Description of the Prior Art

As it is known and very briefly, the technical field is the one of distributors which control the start, the stop and the direction of a flow rate of a gaseous fluid.

The flow distributors are substantially made up of a housing in which it is positioned a spool, a central charge chamber, two downwards discharge branches and two upwards delivery branches. Said spool is generally moved by a motor, which is able to move it in order to modulate the air flow passing through the same distributor.

In the normal functioning of a distributor, in addition to the force needed to accelerate the spool mass, when the displacement dynamics of the spool increases, some dynamic phenomena occur on the air flow thus braking the same motion of the spool. In the charging and discharging steps of a chamber, there are also provided reactions due to the air accelerations in the ducts and on the surface of the spool. Ultimately, the more rapid the spool displacement is, the higher the pressure difference will be between the two ways put in communication: the air expansion and the passage flow rate are maximum and generate very high forces on the whole system.

Such effects can reach very high values, and therefore the distributors of known kind need a motor of great dimensions and power to control and modulate such passage flow by means of an exact displacement of the spool.

Therefore, there exists a need for an innovation which allows to overcome the above described technical problems while maintaining a motor of reduced dimensions and power in a slide flow distributor, and while providing high dynamics and extremely exact spool positioning at the same time.

SUMMARY OF THE INVENTION

The device object of the present invention is a servo-actuator which can be used, for example, in the field of pneumatic systems of valve actuation.

Generally, they comprise a source of compressed air as working fluid, normally provided by an air compressor, which is conveyed through a series of ducts. The compressed air is conveyed in a positioner. The positioner, applied to an actuator, acquires a signal (for example an electric signal) proportional to the value of the position to be controlled (the position of the actuator determines the opening level of a shutter of a valve etc.). On the basis of the input signal received, the positioner controls the air flows to the chambers of the actuator thus determining the displacements of the same actuator. The actuator is just the device generating the desired displacement which determines the opening level of the valve or shutter.

Therefore, object of the present invention is a slide flow distributor having a specific pneumatic servo-actuating system. Said servo-actuator, by exploiting the advantages linked to the presence of compressed air, allows to improve both the "peak" speed of the system and its dynamic modulation, thus making it faster, so that it is possible to have the nearest air flow rate regulation possible to what theoretically needed.

This aim is reached by actuating the distributor by means of a linear motor, characterized by a high dynamics and by a low force provided, with the contribution of the new pneumatic servo-actuator. A preferred embodiment of the present invention provides the use of a Voice Coil Motor (VCM) able to move the spool in the distributor up to one eighth of the time needed by a Step Motor configuration (commonly used in said applications) with equal electric power.

Firstly, the present invention is advantageous in that for little displacement forces (lower than about 70-80% of the maximum force of the motor, percentage which can be regulated), the system is able to displace the spool without servo-actuator thus improving, yet remarkably, the performances in presence of the Step Motor.

Another advantage is provided by the possibility, by means of the servo-actuator, to obtain a very high position accuracy of the spool with high motion dynamics with low power.

BRIEF DESCRIPTION OF THE DRAWINGS

These and other advantages of the invention will be described in the following in more detail with reference to the appended drawings, in which:

FIG. 3 shows a preferred embodiment of the servo-actuator;

FIG. 4 shows a preferred embodiment of the system made up of central rod of the spool, profiled body and motor rod of the servo-actuator;

DETAILED DESCRIPTION OF THE PREFERRED EMBODIMENTS

Figure 1:
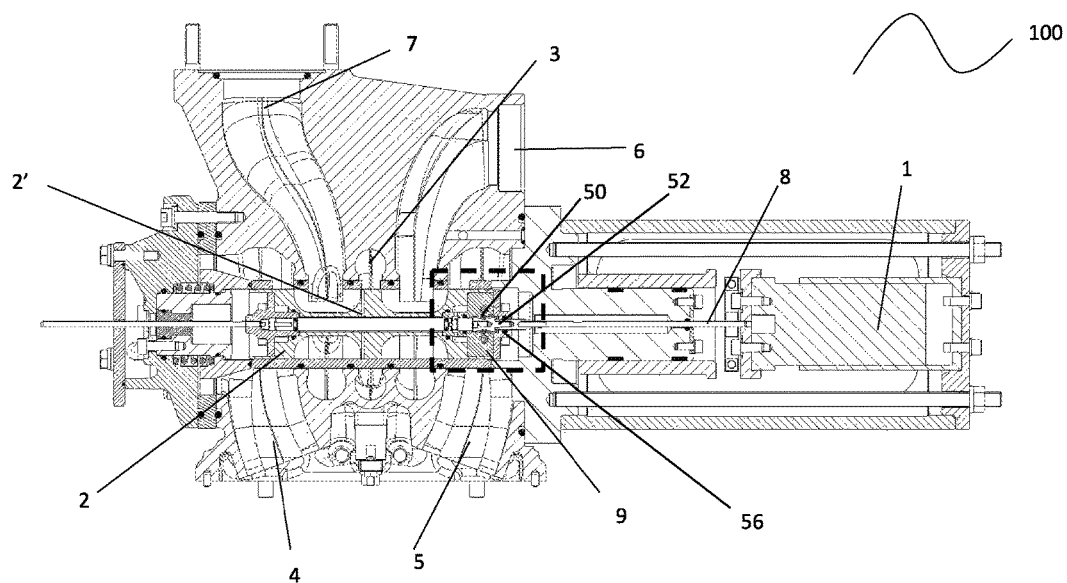
FIG. 1 shows a preferred embodiment of the slide flow distributor.

As it is shown in the appended figures, object of the present invention is a slide flow distributor 100 comprising a motor 1 moving directly a spool 2, this latter having a plurality of holes 2', a central charge chamber 3, two downwards discharge branches 4, 5 and two upwards delivery branches 6, 7 and a pneumatic servo-actuator 9 positioned in the portion of the spool 2 nearer to the motor 1.

With reference to FIGS. 3-7, according to a preferred embodiment, the servo-actuator 9 represented in FIG. 3 comprises various components, arranged between the spool 2 and the motor 1. In particular, there are provided five balls 50 pressed on the side surface of a profiled body 52 by means of five pre-loaded and adjustable elastic means 51. The profiled body 52 makes integral the central rod 53 of the spool 2 with the rod 8 of the motor 1, and thanks to the elastic means 51, makes the whole system integral to the spool 2 by means of said balls 50.

In addition, the servo-actuator 9 comprises two main chambers, an inlet chamber 54 and a storage chamber 55 of air, separated by a seal 56 positioned on the right of the central rod 53. Said inlet chamber 54 of air contains the central rod 53.

Moreover, it is provided a sized discharge channel 57, which allows the air provided in the storage chamber 55 to be vented to the environment.

Figure 5:
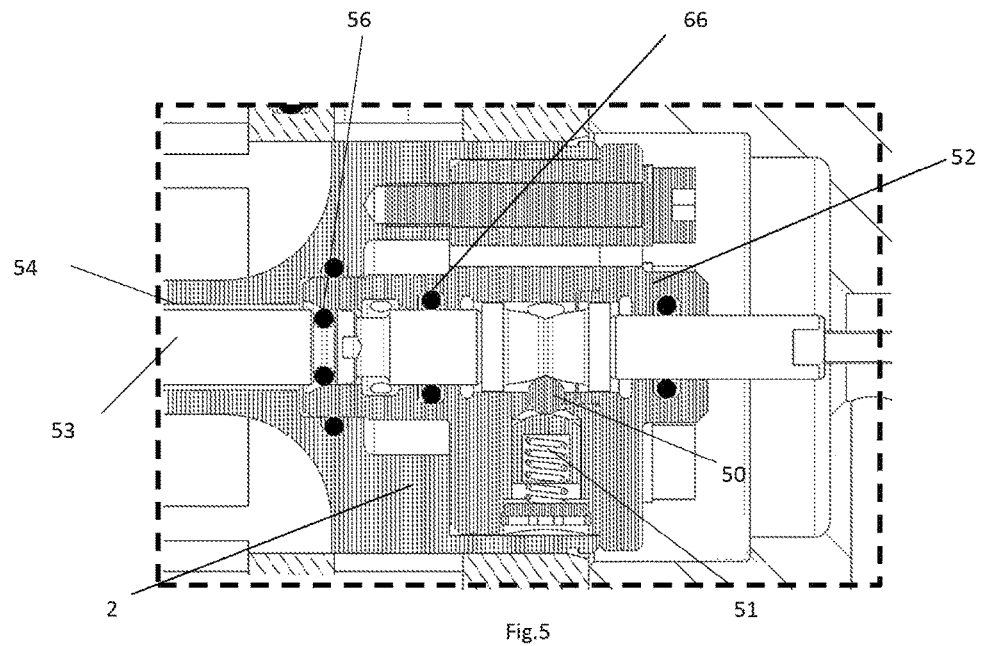
FIG. 5 shows a preferred embodiment of the system made up of the spool and the various components of the servo-actuator integral thereto.

As it is shown in FIG. 4, the central rod 53, the profiled body 52 and the rod 8 of the motor 1, can be considered a first system, while the spool 2 and the various components integral thereto and shown in FIG. 5 can be considered a second system.

In particular, in order to describe the functioning of the servo-actuator 9 two configurations are described separately: the one in which the servo-actuator system is not actuated and so the first system is integral to the second system, and the one in which it is actuated and there is a relative displacement between first and second system.

Figure 2:
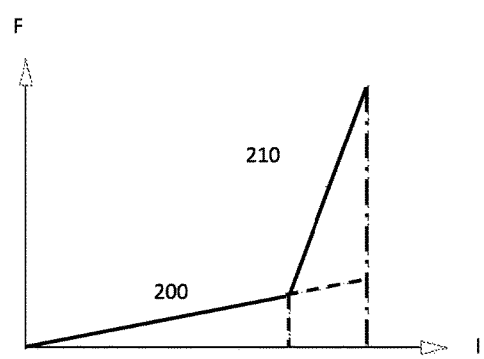
FIG. 2 shows a scheme of the forces and the electric power used by a flow distributor with servo-actuator.

The FIG. 2 shows a diagram having the control electric current I on the x axis and the force F acting on the spool on the y axis. The first section of curve 200 represents the distributor characteristic when only the linear electric motor (VCM) acts. The second section of curve 210 represents the characteristic of the distributor in presence of the activation of the pneumatic servo-actuator. As it is clear from said graph, the system is able to move the spool without the help of the servo-actuator, however the presence of this latter improves its performances definitely.

Figure 6:
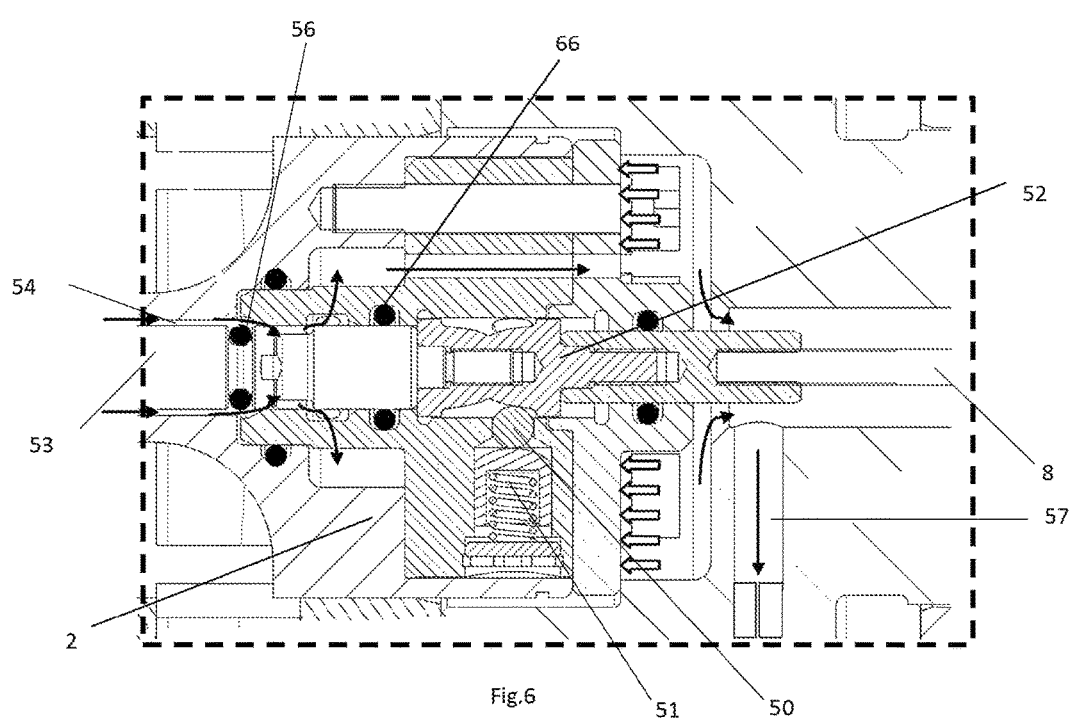
FIG. 6 shows a detail of the Dx end of the spool in opening step of the pneumatic servo-actuator.
Figure 7:
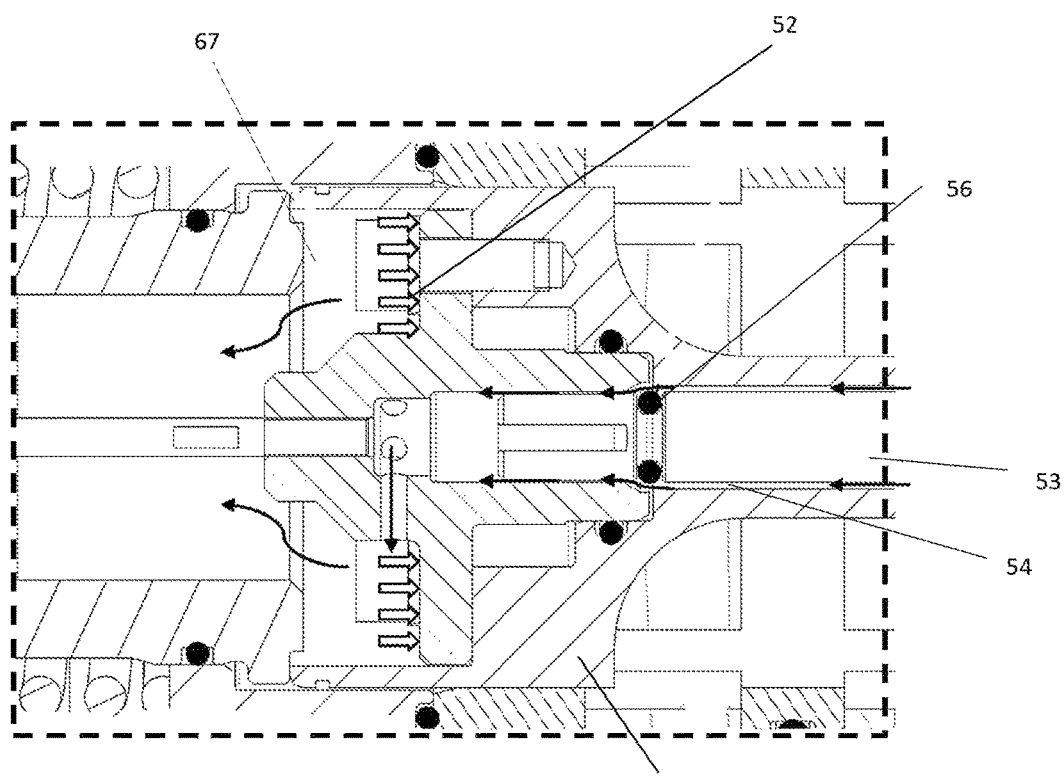
FIG. 7 shows a detail of the Sx end of the spool in closing step of the pneumatic servo-actuator.

The configuration in which the servo-actuator is not actuated is shown in FIG. 3, in which it is represented the right end of the spool 2. The configuration in which the servo-actuator is actuated is shown in FIGS. 6 and 7, wherein in FIG. 6 it is represented the opening configuration of the pneumatic servo-actuator 9 at the right end of the spool 2 and wherein in FIG. 7 it is represented the closing configuration of the pneumatic servo-actuator at the left end of the spool 2.

In the configuration in which the servo-actuator system 9 is not actuated, the force exchanged by the first system results lower than a certain threshold value $F_t$hr and therefore the forces exerted by the elastic means 51 cause the balls 50 not to go out from their grooves. In this way, the first system remains rigid and integral to the second system.

Naturally, the threshold value $F_t$hr depends on the preload of the elastic means 51, on their characteristic of stiffness and on the shape of the section of the profiled body 52. The regulation of such parameters allows to modulate the threshold value $F_t$hr according to the needs, and so, as a consequence, to actuate the servo-actuator 9 or not.

Vice versa, in the configuration in which the servo-actuator system is actuated, the forces increase exceeding the threshold value $F_{thr}$ and a relative little movement between the first and the second system is obtained.

The functioning of the system implies that the motor 1 generates an axial force able to thrust leftwards the first system. So, such force tends to press the left seal 66 of the central rod 53 and to release the right one 56, which does not guarantee the sealing any more (FIG. 6). In this way, there is opened a passage for the air towards the right head of the spool (indicated by the arrows in FIG. 6).

Besides being allowed by the no more sealing right seal 56, the communication between the storage chamber 55 (under pressure) and the inlet chamber 54 of the right head of the spool 2 is allowed also by other holes provided in the remaining components of the second system (indicated by the arrows in FIG. 6).

During such a step, the storage chamber 55 is always supplied and the sized channel 57 is not able to dispose of the exceeding air flow rate thus causing an increase in inner pressure of the same storage chamber 55. In such a condition, the air pressure on the surface of the right head of the spool 2 generates a force in the same direction and development of the initial axial force of the motor 1 (white arrows in FIG. 6) with the result that the spool 2 is accelerated in the desired direction (leftwards in this case). Once the resisting force is won, the balls 50 acting on the slanted plane of the profiled body 52 bring the second system (so the spool) to be integral to the first system (so to the motor) again. The seal 56 will be sealing again, the storage chamber 55 will not be supplied any more and the stored air under pressure will be discharged gradually to the environment through the sized channel 57, so that the axial components of the forces acting on the spool will be brought in balance again.

In the opposite moving direction of the spool 2 (so rightwards), at the left end of the spool 2, it happens that the seal 66 of the central rod 53 of the spool 2 is no more sealing, thus putting in communication the inlet chamber 54 with the storage chamber 67 (FIG. 7). Naturally, also the storage chamber 67 of the spool 2 is in communication with the environment through a sized channel (of known kind and therefore not shown in FIG. 7).

Another embodiment of the pneumatic servo-actuator allows the charging and discharging step in each one of the ends of the spool to be managed separately. In particular, during the opening step of the servo-actuator mechanism, the relative movement of the first system with respect to the second system always allows the chamber of the right head of the spool to be supplied, but it closes the discharge channel towards the environment, characterized in this case by an enlarged section. During such step the chamber of the left head is not supplied but the relative discharge channel is opened, thus favoring the air previously stored to be discharged. The same goes obviously for the opposite movement direction of the spool.

Therefore the most mechanic complication leads to a yet higher dynamics of the forces on the spool since the system provides for the rapid reduction of the pressure at the end on the spool opposite to the one under pressure. Moreover, the end under pressure results faster in going under pressure since, during the charging step of the respective chamber, the sized channel does not dispose of the air flow rate to the environment.

In addition to the embodiments of the invention, as just described, it is clear that many other variants are possible. It is also to be intended that said embodiments are only example and do not limit the object of the invention, its applications or possible configurations. On the contrary, while the above description allows the experts in the field to carry out the present invention at least according to a configuration example thereof, it is to be intended that many variations of the described components are possible, without departing from the scope of the invention, as defined in the appended claims, literally interpreted and/or according to their legal equivalents.

The invention claimed is:

1. A slide flow distributor (100) comprising a motor (1) moving directly a spool (2) by means of a rod (8) of the motor; a charge chamber (3) of the working fluid, in central position, in fluid communication with two discharge branches (4, 5) and two delivery branches (6, 7) and characterized in that from a portion of the spool (2) proximal to the motor (1) it is provided a pneumatic servo-actuator (9) generating a force in the same direction as the axial force of the motor (1), with the result that the spool (2) is accelerated in a predetermined direction, said pneumatic servo-actuator (9) comprising a profiled body (52), a plurality of balls (50) and corresponding elastic means (51) which press said plurality of balls (50) on the side surface of the profiled body (52);

and wherein said pneumatic servo-actuator (9) further comprises two main chambers, an inlet chamber (54) and a storage chamber (55) of air, said two main chambers are separated by a seal (56) positioned at a right end of the central rod (53), and said inlet chamber (54) of air contains the central rod (53) of the spool (2).

2. The distributor (100) according to claim 1, wherein said balls (50) comprise at least five balls and five elastic means (51), whose forces exerted on said balls (50) are adjustable according to a predetermined threshold ($F_r$hr) which prevents the balls (50) not to out from their grooves.

3. The distributor (100) according to claim 1, further comprising a sized discharge channel (57), which allows the air provided inside said storage chamber (55) to be vented to the environment.

4. The distributor (100) according to claim 1, wherein said profiled body (52) at a first end is coupled to a central rod (53) of the spool (2), and at an opposite end, is coupled to the rod (8) of the motor.

5. The distributor (100) according to claim 4, wherein said central rod (53) of the spool (2), the profiled body (52), and rod (8) of the motor are coupled to the movement of the spool (2) when the axial force of the motor (1) does not exceed a predetermined threshold ($F_r$hr).

6. The distributor (100) according to claim 4, wherein said spool (2) is moving independently from said central rod (53) of the spool (2), the profiled body (52) and the rod (8) of the motor, whenever the axial force of the motor (1) exceeds said predetermined threshold ($F_r$hr).

* * * * *